United States Patent [19]
Jacob et al.

[11] Patent Number: 5,781,108
[45] Date of Patent: Jul. 14, 1998

[54] AUTOMATED DETECTION AND MONITORING (ADAM)

[75] Inventors: Robert C. Jacob; Jeffrey S. Stewart, both of Melbourne, Fla.

[73] Assignee: Future Tech Systems, Inc., Melbourne, Fla.

[21] Appl. No.: 557,285

[22] Filed: Nov. 14, 1995

[51] Int. Cl.$^6$ .................................................. G08B 13/18
[52] U.S. Cl. ...................... 340/552; 340/541; 340/565; 340/567; 340/517; 340/521; 340/522
[58] Field of Search .................... 340/541, 545, 340/551, 565, 567, 555, 517, 521, 522, 550, 552, 553, 554, 692, 825.06

[56] References Cited

U.S. PATENT DOCUMENTS

| | | | |
|---|---|---|---|
| 3,530,432 | 9/1970 | Pope | 340/541 |
| 4,344,071 | 8/1982 | Allen | 340/566 |
| 4,433,328 | 2/1984 | Spahir et al. | 340/555 |
| 4,520,576 | 6/1985 | Molen | 34/45 |
| 4,523,185 | 6/1985 | Roth | 340/524 |
| 4,551,654 | 11/1985 | Barnum | 315/159 |
| 4,755,973 | 7/1988 | Meier et al. | 367/93 |
| 4,821,027 | 4/1989 | Mallory et al. | 340/521 |
| 5,132,681 | 7/1992 | Yabe et al. | 340/566 |
| 5,148,468 | 9/1992 | Marrick et al. | 379/56 |
| 5,293,097 | 3/1994 | Elwell | 315/154 |
| 5,311,166 | 5/1994 | Frye | 340/541 |
| 5,315,285 | 5/1994 | Nykerk | 340/426 |
| 5,483,224 | 1/1996 | Rankin et al. | 340/541 |
| 5,532,680 | 7/1996 | Ousborne | 340/567 |

*Primary Examiner*—Jeffery Hofsass
*Assistant Examiner*—Daryl C. Pope
*Attorney, Agent, or Firm*—Brian S. Steinberger; Law Offices of Brian S. Steinberger

[57] ABSTRACT

A monitoring and detection system that continually monitors a person(s) presence passing through areas such as rooms, homes, buildings and the like. The system can include multiple operating modes such as a home mode for greeting visitors and normal facility users as well as a secure mode for protecting the facility and occupants from intruders. The novel system provides for multi-task control of all electrical functions in a home such as air conditioning, lights, power and the like. The system can operate events via completely timed static events(i.e. for preselected time periods). The invention can also be used to activate or deactivate events through sensor detection. The preferred embodiment uses ultrasonic sweep sensors which can be programmed to automatically detect person(s) animal(s) that cross protected areas over certain times of the day, week, month based on different conditions, as well as dry contact sensors such as contact switches for doors and windows and the like. The ultrasonic sensors can further have their sweep signals change their operating sweeping ranges during certain times of the day, week, month and over time. The invention can further be used be used to activate and deactivate events directly and/or remotely. Finally, the invention can use any combination of multi-task controls of the above. The invention uses audible greetings with these systems to welcome person(s) approaching homes, buildings, rooms and the like. Selected verbal communications, sounds and the like can be selectively input into the system for later desired playback. The system allows for a person passing through an area to be directed to points of interest in an area such as a lamp, entertainment center, wall-hanging and the like. In a second secure mode, the ultrasonic sensors, and dry contacts can sense for intruders to activate verbal voice warnings through interior and exterior speakers, and further activate sirens, lights and remote alarms.

10 Claims, 11 Drawing Sheets

AUTOMATED DETECTION AND MONITORING (ADAM)

This invention relates to an automated detection and monitoring system(ADAM), and in particular to a system that uses ultrasonic signals to sweep interior areas such as a room, home, building or facility and outdoor areas to detect both friendly visitors in a home mode and intruders for a secure mode. The system can turn on equipment such as lights when the person approaches a selected area and audible voice greeting messages giving directional input to that person occupying the space. The secure mode can activate alarms such as warning voice messages, sirens, lights and sprinklers.

BACKGROUND AND PRIOR ART

Various security systems exist for the home and office that can turn-on lights and sirens based on intruder detection. These systems are generally restricted to using acoustical and infra-red sensors where a person entering and approaching a building causes a light or alarm to be activated. See for example, U.S. Pat. No. 4,344,071 to Allen; U.S. Pat. No. 4,433,328 to Saphir et al.; U.S. Pat. No. 4,551,654 to Barnum; U.S. Pat. No. 4,755,973 to Meier et al.; and U.S. Pat. No. 5,293,097 to Elwell.

Automobiles now use voice warning systems along with the light and audible alarms mentioned previously. However, these systems are generally restricted to passive warnings and alarms to stay away from the protected vehicle. See U.S. Pat. No. 5,315,285 to Nykerk.

The prior art is generally directed to alarm type security systems. None of the above systems continually monitors a person(s) presence and location passing through areas such as rooms, homes, buildings and the like. The prior art does not provide for multi-task control of all electrical functions in a home such as air conditioning, lights, power and the like. None of the prior art fully integrates technology to use audible greetings with these systems to welcome person(s) approaching homes, buildings, rooms and the like. Furthermore, none of the above systems allows for a person passing through an area to be directed to points of interest in an area such as a lamp, entertainment center, wall-hanging and the like.

Thus, the need exists for a system that addresses the problems presented above.

SUMMARY OF THE INVENTION

The first objective of the present invention is to provide an automated system for a home having a human voice greeting a person approaching the home.

The second object of this invention is to provide an automated system for a home to activate exterior lights and a doorbell when a person approaches the home.

The third object of this invention is to provide an automated system for a home where appliances such as lights, entertainment center, air conditioning, ceiling fan(s) are turned-on when a person enters a room.

The fourth object of this invention is to provide an automated system for a home where appliances such as lights, entertainment center, air conditioning, ceiling fan(s) are turned-off when a person leaves an area.

The fifth object of this invention is to provide an automated system for a home that automatically opens and closes openings such as doors, windows, window treatments (blinds, drapes) when a person approaches and respectively leaves the opening.

The sixth object of this invention is to provide an automated system that has a voice output for providing directional instructions with a visitor and user.

The seventh object of this invention is to provide an automated system for a home that educates a person to points of interest in a particular room and area.

The eighth object of this invention is to provide a system that can automatically operate and control events for preselected time periods.

The ninth object of this invention is to provide a system that can activate or deactivate events through sensor detection.

The tenth object of this invention is to provide a system that can activate and deactivate events directly and/or remotely.

The eleventh object of this invention is to provide a system that can operate tasks in the home through multi-control combinations.

The novel automated detection and monitoring (ADAM) system works both inside and exterior(outside) to a facility. The types of facilities that can be encompassed include but are not limited to a house, room, and building. The novel system is completely programmable via a standard multi-media personal computer. All programmed functions are stored in non-volatile memories for protection from power outages. The programmable functions include audible messages, sensor inputs, X10 output commands, and discrete output commands. Interaction of above functions can be programmed in any combination. For example, the system can activate a sprinkler when a would-be-prowler approaches a specific area during a specific time. The system can notify the owner inside a home that someone is approaching the facility, prior to them getting there. The system will provide different messages both interior and exterior to a facility based upon position, time and situation. The system would deter a would-be-prowler prior to getting close to the facility through voice warnings, sirens, lights and combinations, thereof. Sensors can be located both inside and outside the facility.

The sensors and transducers in the ADAM system can be used for a secure mode(provide security to the system) and as a home mode(greeting and facilitating passing through the facility). The time of day and night and the current situation of the facility will be used to decide what mode the ADAM system is operating within. For example, at 7:00 pm, the ADAM system can sense an arriving visitor the facility and respond with the greeting "Welcome to the JACOB home." At 1:00 am, the ADAM system using the same sensors responds with the greeting: "The alarm system is set, please step away from my home."

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
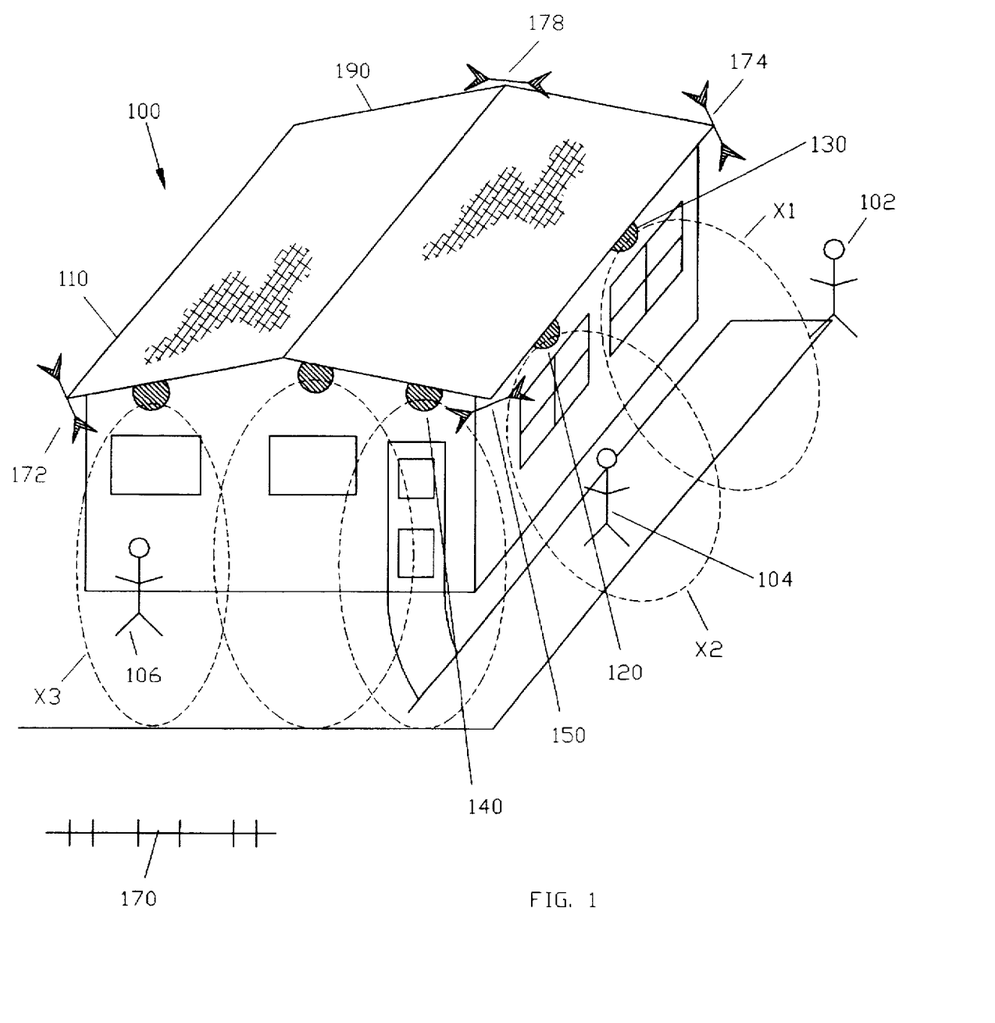
FIG. 1 illustrates a perspective overview of the ADAM invention illustrates a preferred embodiment of locating the sensors and transducers of the ADAM system on the exterior of a home-facility.

FIG. 1 illustrates a perspective exterior view 100 of the ADAM invention in a secure mode. In FIG. 1, range transducers 110, 120 and 130 can be situated at various locations on the exterior of a building 190. Transducers 110, 120 and 130 include both ultrasonic range type sensors and dry contact sensors. The types of ultrasonic sensors include but are not limited to the Ultra-100 having a range of 6–10 feet and beam width of approximately 17.5 degree manufactured by Senix Co., the Ultra-U having a range of approximately 2 inches to 37 feet with a beam width of approximately 15 degrees also manufactured by Senix Co., and the 9000 series transducer having a beam width of approximately 18 by 38 degrees manufactured by the Polaroid Corp. The dry contact sensors include contact switches that are used for windows and doorways and their support frames such as surface reed contacts part no. 7939 having a ⅞ inch gap manufactured by Ademco Co., surface magnetic contact sensor no. PS 1541 having a ½ inch gap manufactured by Aleph Co., ⅛ inch recessed door contacts having an ¼ inch gap manufactured by Alelph Co., Roller plunger switch having a ¾ inch gap manufactured by Sentrol Co.

Dry contact sensors useful for the ADAM system further include a passive sonic forced intrusion detector such as the Audio discriminator manufactured by Caddx. Another type of dry contact sensor includes a thermally isolated bimetal disc such as a fixed temperature switch, a water sensor that detects fluids such as water and nonflammable liquids, a driveway sensor such as a piezoelectric pressure sensor for detecting vehicles passing over the sensor. Further types of dry contact sensors include smoke detectors such as but not limited to the photoelectric smoke detector model no. ES-429AT manufactured by Sentrol. Other types of dry contact sensor include a heat detector able to detect 135 degree rate of rises, such as but not limited to model no. ES-71354, ESL700 series manufactured by Sentrol. Still another type of dry contact sensor useful for this novel system includes passive infra-red detectors such as model no. PA6812E manufactured by Pulnix, and photoelectric beam sensors such as model no. PB-60TK manufactured by Pulnix.

A preferred embodiment of positioning and operating the sensors and transducers of the ADAM system 100 on the exterior of a facility such as a home will now be discussed in reference to FIG. 1. In FIG. 1, ultrasonic range sensors 110, 120, 130 and 140 can detect approaching intruder 102 at a first preselected distance X1 of approximately 20 feet or less to the building. At 20 feet a voice message inside house 190 can alert the home occupant with a voice message via speaker 205(better shown in FIG. 2) that "an intruder is within 20 feet of the house 190." Referring again to FIG. 1, sensors 110, 120 and 130 can be programmed to detect the approaching intruder 104 is at a second preselected distance X2 of approximately 10 feet or less to the building 190. At 10 feet, the invention can be programmed to deliver an external voice message via speaker 150 that "house alarm has been turned on . . . please leave at once." At 10 feet, internal lights inside house 190 such as lamps 202, 204 (better shown in FIG. 2) start flashing. Optionally, an exterior underground sprinkler system can also be turned on at the 10 foot threshold. Within a third preselected distance X1, of approximately 1 foot to home 190, the invention can be programmed to again alert the home occupant with a voice message that an intruder is still outside. At the 1 foot threshold, exterior lights 172, 174, interior lights 202, 204 can be flashing and an audible siren 178 can be activated. At 1 foot the invention can signal a remote monitoring service to summon the police and the external speaker 150 can broadcast another voice message such as "the police are on the way." Although, the preferred embodiment describes three distance thresholds more or less distance thresholds can be utilized. Further, each distance threshold can include variable alarm signals(i.e. different decibel levels and the like.

Figure 2:
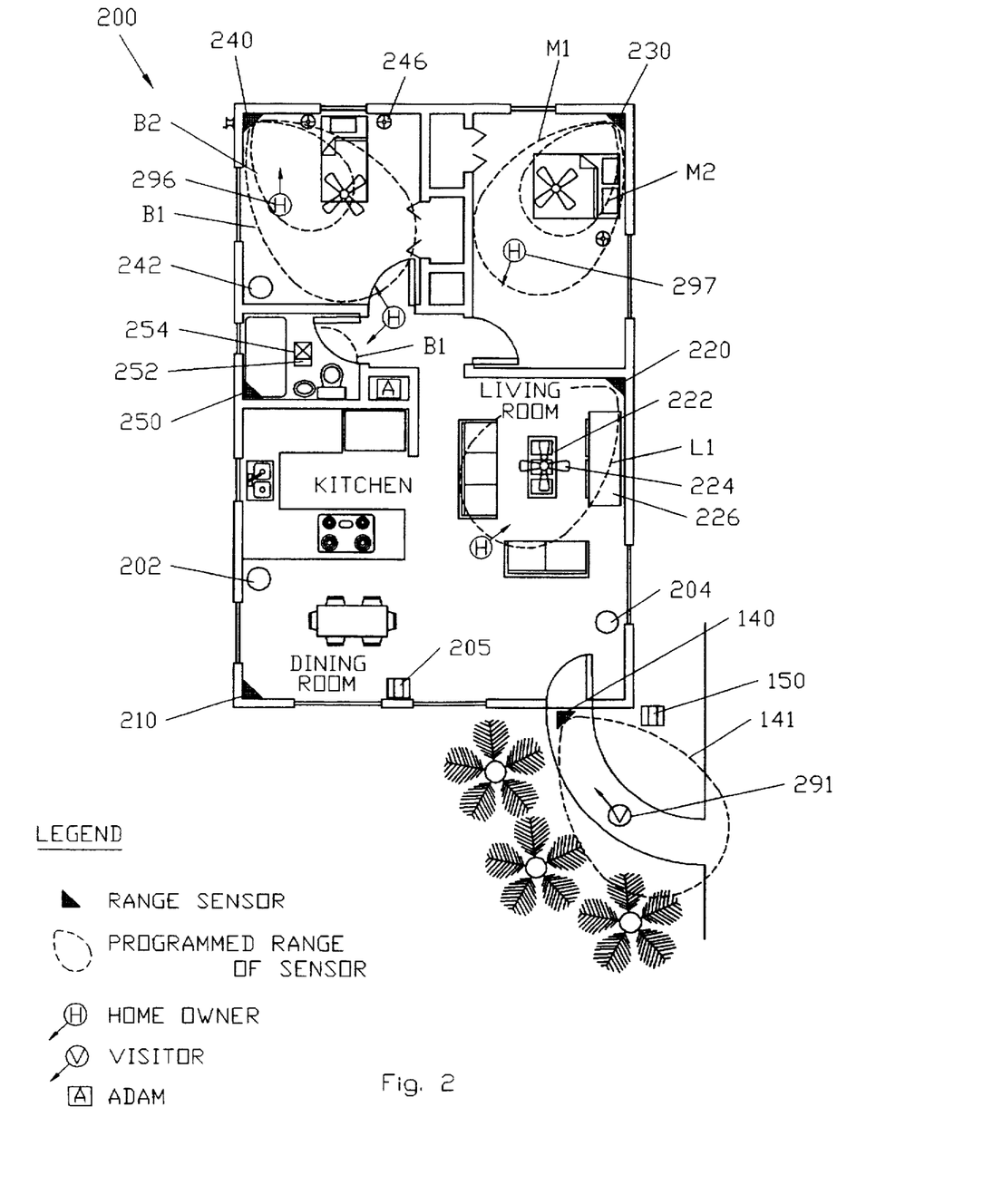
FIG. 2 illustrates a perspective view of the ADAM invention illustrates a preferred embodiment of locating the sensors and transducers of the ADAM system inside of a home-facility.

A preferred embodiment of positioning and operating the sensors and transducers of the ADAM system 200 on the interior of a facility such as a home will now be discussed in reference to FIG. 2. Referring to FIG. 2, a visitor 291 approaching a front door area range 141 can be detected by a ranging sensor 140 at a selected range of approximately 5 feet, and a voice message can be broadcast at speaker 150 such as "Welcome to the "homeowners name"residence." An interior speaker 205 such as a doorbell can be automatically activated at this 5 foot range thus alerting home occupants 293, 295 and 297 that a visitor 291 is outside the house.

Referring to FIG. 2, occupants entering various portions of the house can activate an electrical device in the room and for deactivating the electrical device when the occupant exits the room. The electrical device can include a light, a ceiling fan, an air conditioning heating and cooling system and a television/stereo system. For example, occupant 293 entering living room range L1 can be detected by range sensor 220 can turn on overhead light 222, ceiling fan 224 and an entertainment center 226 such as a television, stereo and the like. Occupant 295 entering bedroom range B1 can trigger range sensor 240 that turns on ceiling light 242 and ceiling fan 244. When occupant 295 approaches range B2, ceiling light 242 can turn off while bed lamp 246 is turned on. Occupant 297 entering master bedroom range M1 and M2 can activate similar electrical devices. Occupant 295 entering bathroom range B1 can trigger range sensor 250 which in turn can turn on light 252 and exhaust fan 254. The range sensors 210–250 can each be programmed with variable multiple threshold ranges such that person(s) passing through the house cause lights, air conditioning heating/ cooling and television/stereo devices to be activated and deactivated.

The sensors and transducers in the ADAM system can be used for a secure mode(provide security to the system) and as a home mode(greeting and facilitating those entering and passing through the facility). The ADAM system can switch back and forth between a secure mode and a home mode automatically by a timer, through a keypad(both shown in FIG. 5), or by a combination, thereof.

ADAM can put itself into a secure mode automatically by time. For example, 5 minutes prior to going into the secure mode it can give a verbal message within the interior of the facility such as "ADAM is ready to go into the secure mode." If at that time, the user/owner of the facility did not want ADAM to go into the secure mode, all the user/owner has to do is open a door, or step into a certain place. This preselected action would be sensed by ADAM such that ADAM would know not to change modes and respond with a verbal type message that "Secure mode has been aborted." If the owner/user did not stop it from going into secure mode then from that point on the sensors would function in the secure mode. Programming the system would determine which mode ADAM would be in at any given time. For example, the automatic secure mode could occur on Monday through Fridays only from approximately 11:00 pm to 8:00 am. Going from the secure mode to the home mode could be done the same way. At approximately 5 minutes prior to changing modes ADAM can provide a verbal message telling the owner that ADAM will turn off in 5 minutes. If at that time the owner did not want ADAM to turn off the owner could open the same door or stand in the same place as they did beforehand. If the owner wanted to turn ADAM off, they would not follow that action.

Using a keypad(shown as 522 in FIG. 5) can also switch the modes of operation for ADAM. For example, ADAM can be programmed with a preselected input that acts as a toggle switch to arm and disarm the ADAM system. This keypad input would select whether the secure mode or the home mode was being activated. Changing from secure mode to day mode would work the same, the owner would punch in their key combination and the keypad would toggle ADAM to the other mode.

Figure 3:
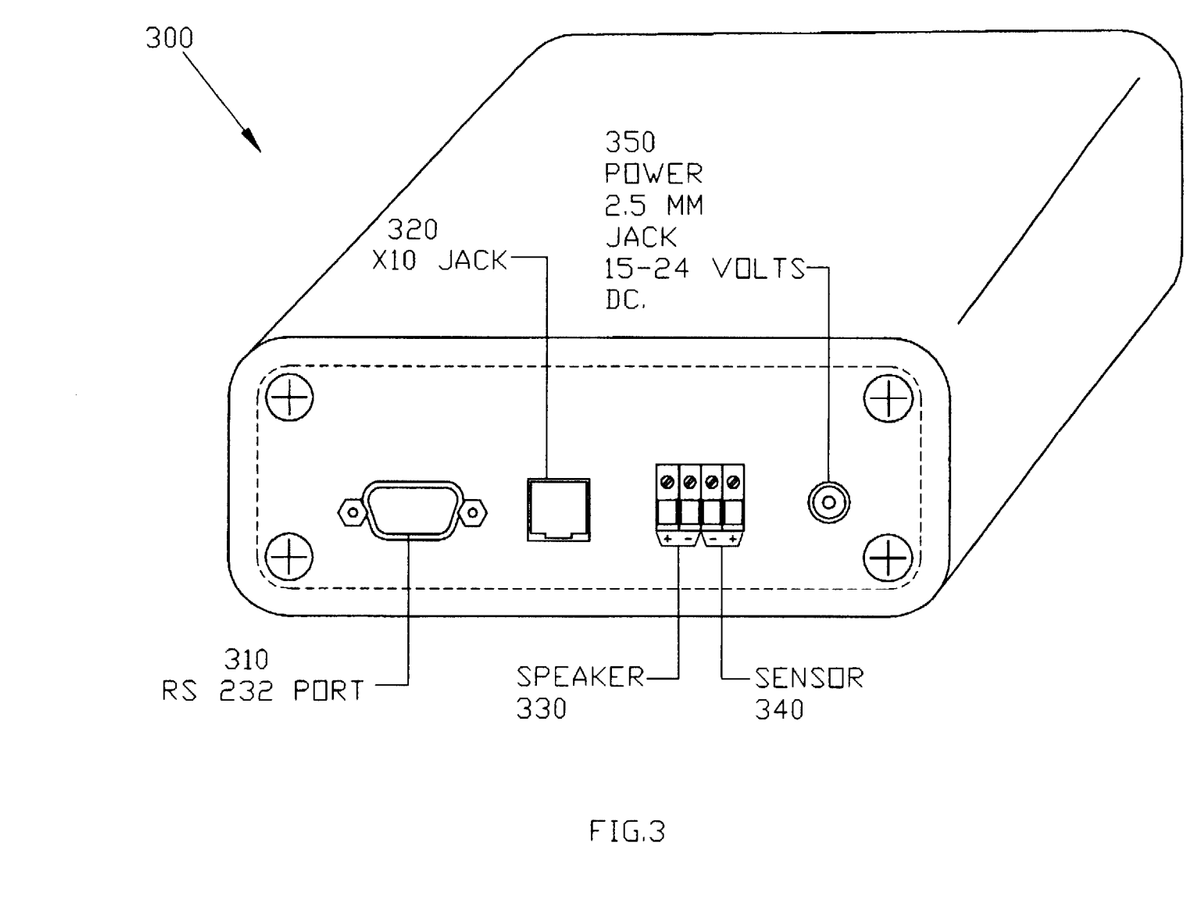
FIG. 3 is a perspective view of the ADAM invention control box.
Figure 4A:
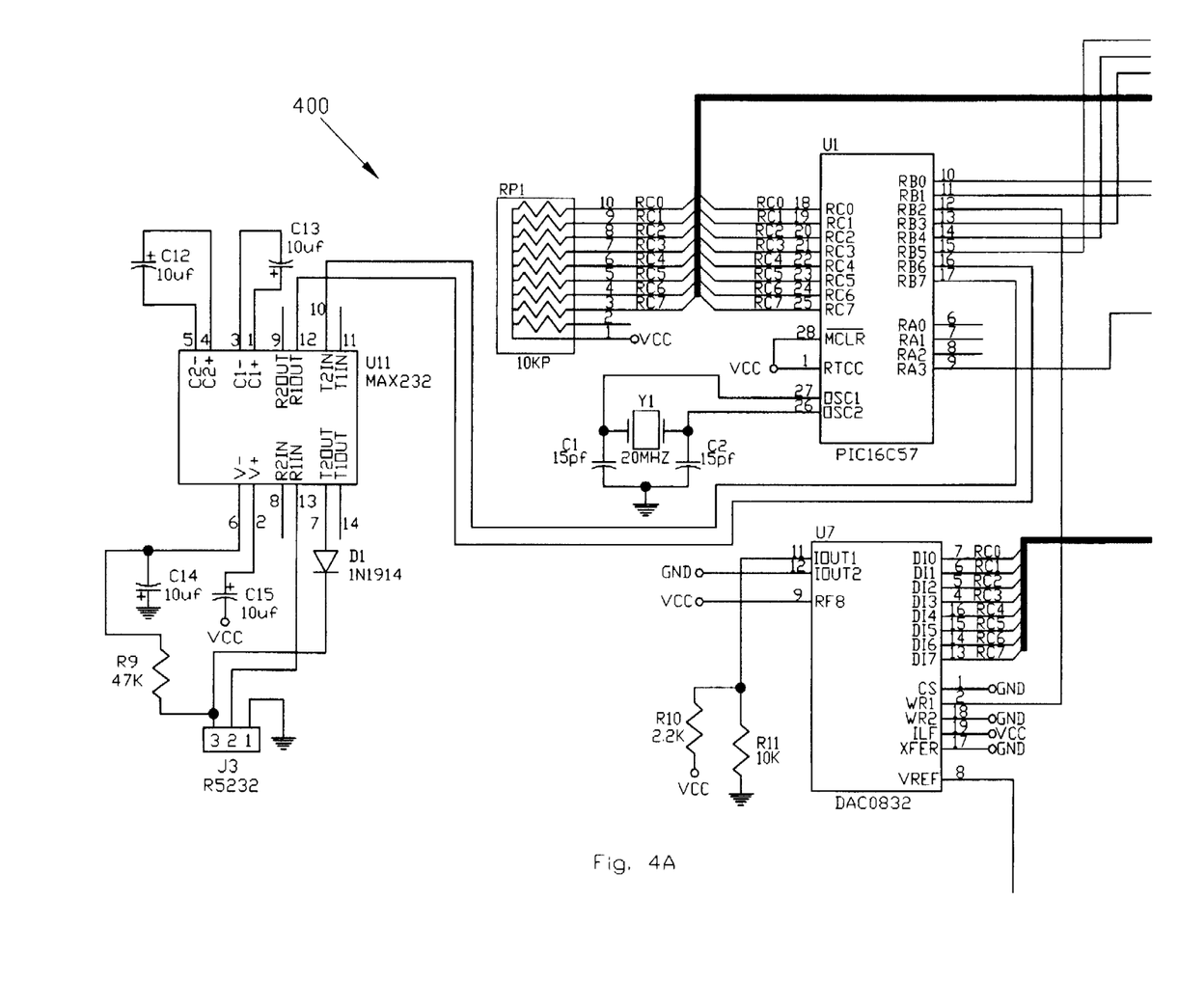
FIG. 4 is a schematic diagram of the electrical circuit of the control box of FIG. 3.
Figure 4B:
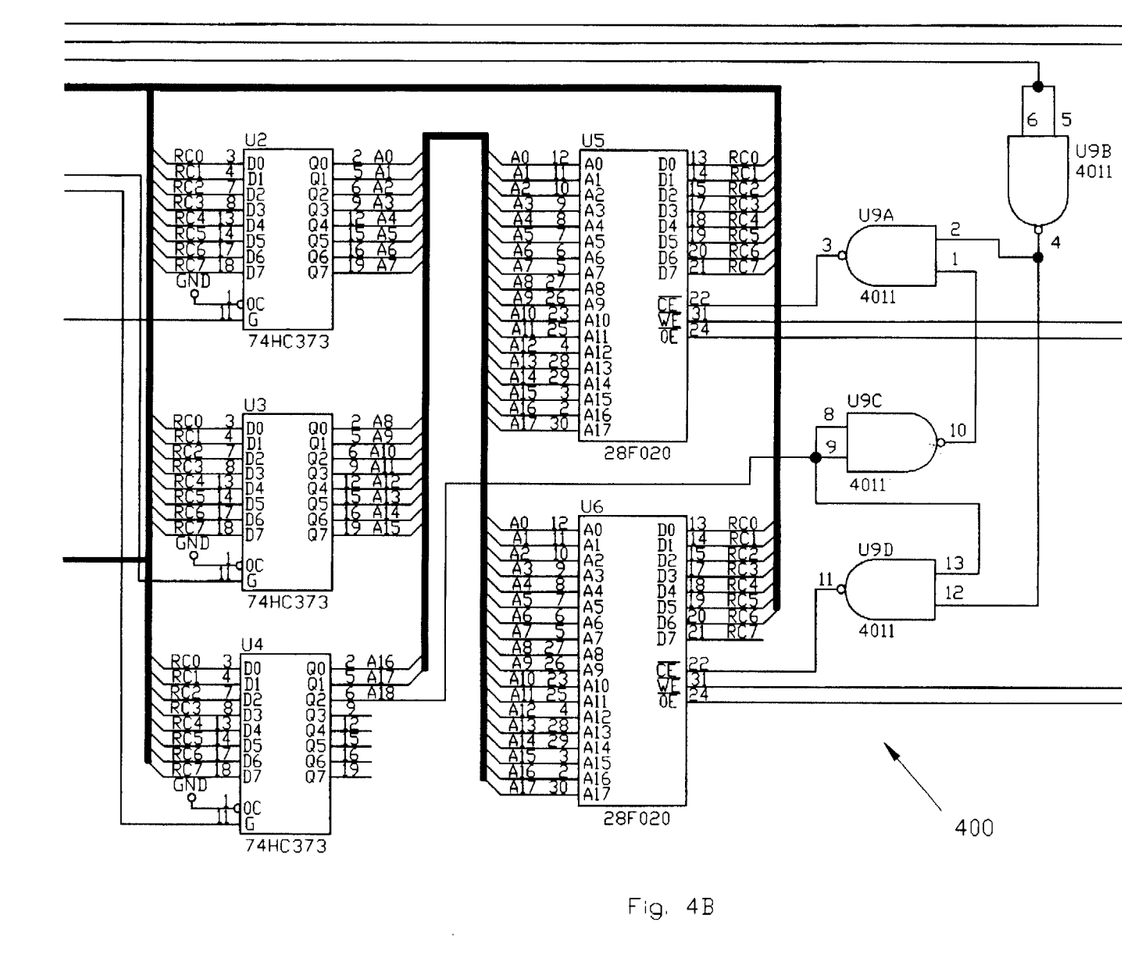
Figure 4C:
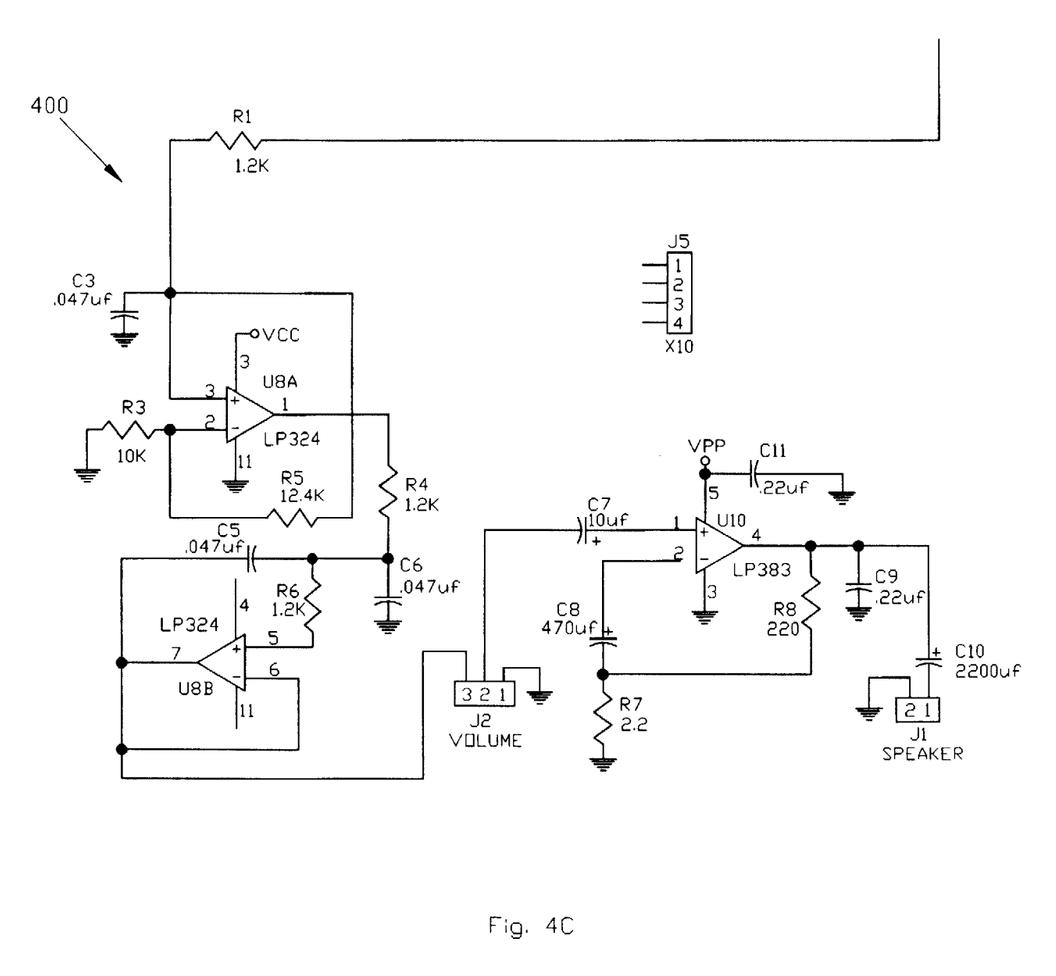
Figure 4D:
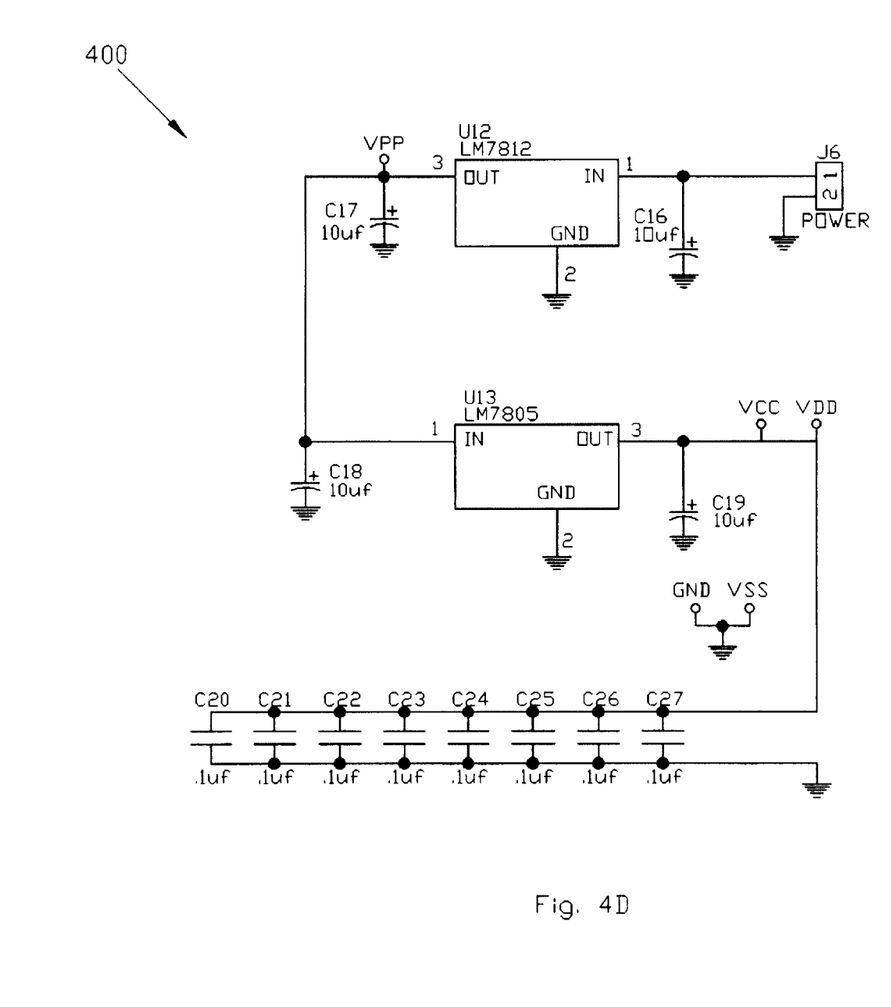

FIG. 3 is a perspective view of the ADAM invention control box 300. Component 310 is a terminal block used to connect a female RS232 connector from ADAM to a personal computer, PC, the type of computer used can be a home computer such as an IBM PC compatible multimedia compatible 486, or alternatively a Macintosh Performa Series and Power Mac Series. Referring to FIG. 3, the control box 300 can be programmed using a PC connected through port block 310. The programming of the PC will be described later. Jack 320 is used for connection to an off the shelf product such as a TW523(which will be discussed later) which can be used to transmit a carrier signal, X10 signals, from ADAM to the electricity in the facility. Electrical contacts 330 are used for connecting ADAM 300 to a 8 ohm 15 speaker 514. Contacts 340 are a sensor input where an ultrasonic detector or dry contact sensor switch is tied to ADAM 300. Port 350 is for attaching a power cord that supplies approximately 12 to 24 volts DC to run ADAM 300. The power supply for ADAM 300 can be run by a model no. AK-ASPS5BFS2 24 VDC 1 amp and model no. ASPI 6-24VDC 4 amp both manufactured by AlarmSaf Col., or a model no. ASRBI 6,12,24 2 amp manufactured by Advanced Signal Co.

FIG. 4 is a schematic diagram of the electrical circuit 400 in the control box 300 of FIG. 3. The component part, quantity, reference number and description are described in TABLE 1.

TABLE 1

| Item | Quantity | Reference | Part |
| --- | --- | --- | --- |
| 1 | 4 | C7, C9, C11 | .22 UF capacitors |
| 2 | 2 | C1, C2 | 15 PF capacitors |
| 3 | 3 | C3, C5, C6 | .047 UF capacitors |
| 4 | 1 | C10 | 2200 UF capacitors |
| 5 | 8 | C12–C19 | 10 UF capacitors |
| 6 | 9 | C20–C28 | .1 UF capacitors |
| 7 | 1 | D1 | 1N1914 |
| 8 | 1 | J1 | SPKR/SENSOR |
| 9 | 1 | J2 | POT potentiometer |
| 10 | 1 | J3 | RS232 terminal block |
| 11 | 1 | J5 | X-10 wire medium |
| 12 | 1 | J6 | power supply |
| 13 | 1 | R | 33 regulator |
| 14 | 1 | RN1 | 2.2K net voltage regulator |
| 15 | 4 | R1, R2, R4, R6 | 511 resistors |
| 16 | 5 | R3, R11, R12, R13, R14 | 10K resistors |
| 17 | 2 | R5, R9 | 47K resistors |
| 18 | 1 | R8 | 220 resistors |
| 19 | 1 | R10 | 2.2K resistors |
| 20 | 1 | U1 | PIC16C57-HS/P micro controls |
| 21 | 3 | U2, U3, U4 | CD74HCT373E micro controls |
| 22 | 2 | U5, U6 | P28F0020-90 micro controls |
| 23 | 1 | U7 | DAC0832LCN micro controls |
| 24 | 1 | U8 | LM324N micro controls |
| 25 | 1 | U9 | CD4011CN micro controls |
| 26 | 1 | U10 | LM383T micro controls |
| 27 | 1 | U11 | MAX232CPE micro controls |
| 28 | 1 | VR1 | LM781CT voltage regulator |
| 29 | 1 | VR2 | LM7805CT voltage regulator |
| 30 | 1 | Y1 | 20 MHZ |

Referring to FIGS. 3 and 4, the operation of ADAM is controlled by a micro controller U1. The micro controller contains firmware that executes all functions of ADAM, which includes: processing of sensor data, playing stored audio messages, receiving program information from an outside PC(to be described later), flash memory management and X010 command control. The program information for ADAM, including the digital audio messages, is stored in flash memory U5 and U6. This memory is non-volatile and retains its information when power is removed. The information stored in memory U5 and U6 is received from a PC and processed by U1. The interface of the flash memory to the micro controller U1 and digital to analog converter U7 is accomplished with U2, U3, U4 and U9.

Referring to FIGS. 3 and 4, the digital audio message is processed by digital to analog converter U7. U7 receives the digital form of audio message from the flash memory U5 and U6. The analog output from U7 is then passed through a low pass filter, U8a and U8b, and amplified by U10 to directly drive a speaker. A potentiometer is connected to J2 to control volume. The interface of the micro controller U1 to the PC is accomplished by U11. U11 is an RS232 to TTL converter. The RS 232 signal from the PCs serial communication port is directly connected to J3. Power for the ADAM unit 300 is connected to J6 and is regulated by VR1 and VR2.

Figure 5:
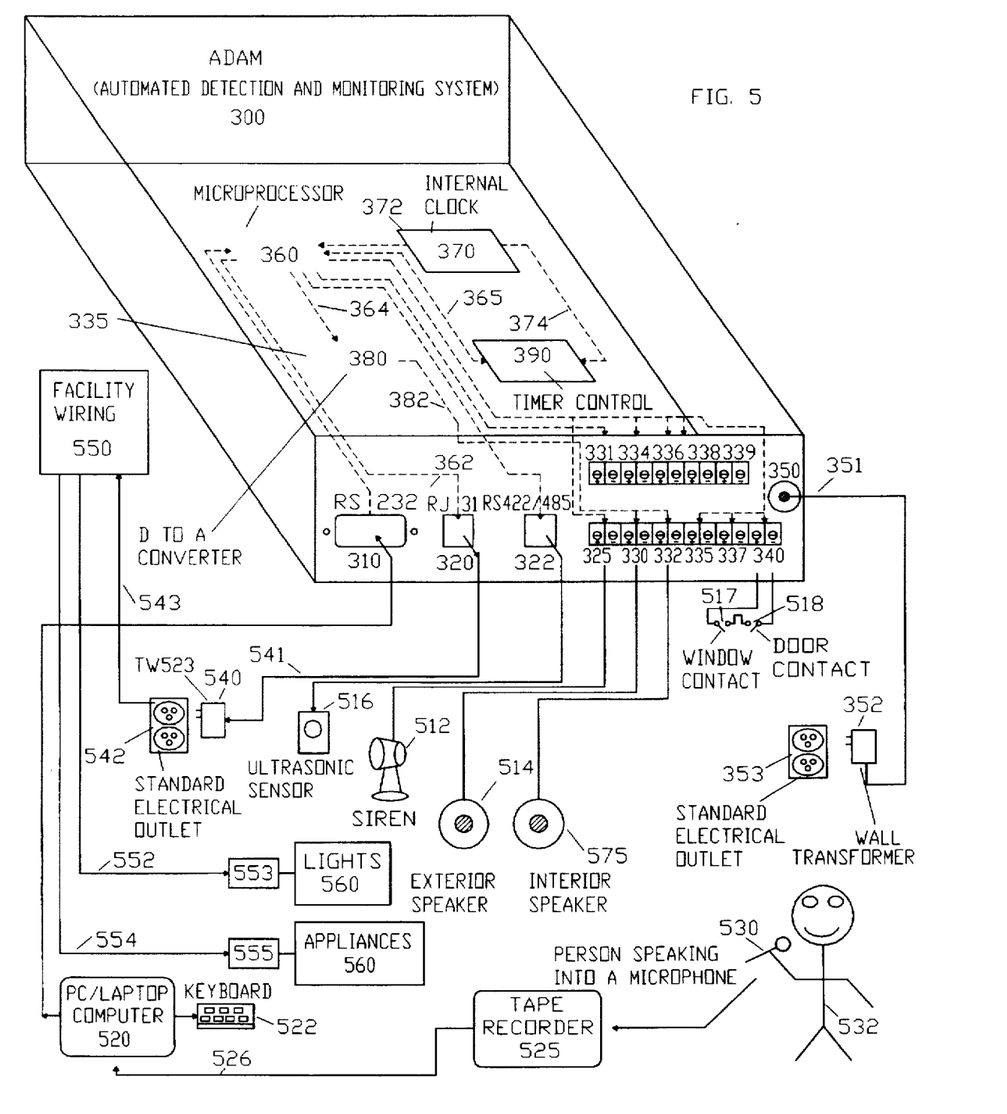
FIG. 5 is a perspective view of a preferred embodiment connecting ADAM to components in a facility.

FIG. 5 is a perspective view of a preferred embodiment 500 showing ADAM 300 (with blocks representing some of the basic internal circuitry described in detail in reference to FIGS. 3 and 4) connected to other components in a facility. External power to ADAM 300 can be supplied via an electrical connector at port 350 receiving a male plug and cord 351 which is connected to a UL listed 12 volt DC transformer 352 which is plugged into a conventional 110 Volt electrical outlet 353 in the facility.

Referring to FIG. 5, internal clock 370 controls both the microprocessor 360 and a timer control 390 through respective lines 372 and 374. Both the microprocessor 360 and the timer control 390 have two way communication along line 365. Microprocessor 360 connects by line 364 to Digital-to-Analog converter 380 which is connected by line 382 to terminal contacts 330 and 332. Microprocessor 360 directly connects via line 369 to terminal contacts 325, 334, 335, 336, 337, 338. Microprocessor 360 is directly connected by line 366 to port 322. Microprocessor 360 is directly connected by line 368 to terminal contact 332. Microprocessor 360 can receive input further from PC/Laptop 520(to be described later), ultrasonic sensor(s) 516(which were described previously) and various window contact(s) 517, door contact(s) 518 and other dry contacts(which were previously described) that can be plugged into various terminal contacts 332, 334, 336, 338, 339.

For creating the voice/sound effects in ADAM 300, an audio track is laid out. Person 532 uses a microphone 530 to dictate voice greetings into ADAM via a digital tape recorder 525(preferably having bass and treble controls) such as but not limited to a Sony Walkman. The audio tracks can be approximately 3 to 90 seconds in length and can include any sound placed on a cassette tape such as but not limited to barking dogs, gun shots, police siren, human greeting and warning voices, computer generated voices, computer generated sounds and the like. The audio tracks can be created in several different ways as follows:

(a). Person 532 speaks into a microphone 530 and records the message via recorder 525;

(b). Person 532 uses pre-recorded tape(i.e. store-bought and the like);

(c). Person 532 can tape sound tracks from a stereo system;

(d). Person 532 can record sound tracks off their computer; and (e). Person 532 can record sound tracks from the Internett.

Referring again to FIG. 5, once messages are on tape, recorder 525 is coupled though line 526 to a PC/Laptop 520(previously described such as an IBM compatible 486 Multimedia computer and the like) and downloaded through RS232 port 310 into internal microprocessor 360 via line 355. The sounds are used to create a sound file which is stored in microprocessor 360 and used for later applications as was previously described. A voice synthesizer 380 converts the digital signal from the microprocessor via line 364 which feeds the voice signal along 382 to outside audio speaker 514 via terminal contacts 330. Audio speaker 514 can be a Sounddolier 8 ohm speaker model no. AT-FD72W manufactured by Atlas. Other types of audio speakers that are 8 ohm and having a minimum of 15 watts can be used. Interior speaker similar to the type used as outdoor audio speaker 514 can be connected to terminal contacts 332. Terminal contacts 334 and 336 can be used for extra speakers, door contact switches, window contact switches and the like. A high decibel siren 512 can also be used as in the secure mode as was previously mentioned and is connected via terminal port 325 as was described previously. Window contact sensors 517 and door contact sensors 518 can together be connected in series and connected to contact terminal 340. Terminal contacts 332, 334, 336, 338, and 339 can be used for additional window and door contact switches and the like.

Ultrasonic sensor 516 can be connected to ADAM 300 through RS422/485 Port 322. Up to thirty six(36) ultrasonic sensors can be connected in series together through port 322.

In operation, microprocessor 360 transmits over line 362 through RJ31 Port 320 which is connected by a standard telephone cord line 541 which is connected to a Plug 540 such as off-the-shelf TW523 plug which has prongs for connecting into a standard electrical facility wall outlet 542. The TW523 Plug 540 allows for a carrier signal to be sent over conventional wiring 543, 550 in the facility through electrical power lines 552, 554 that supply power to lights 560 and appliances 580. Additional receiver adapters 553, 555 such as an X10 receiver, then intercedes and control the power supply to those lights 560 and appliances 580. Both the X10 receiver and the TW523 transmission plug are manufactured by X10® Powerhouse™ Co. of 185A LaGrande Ave., Northvale, N.J. 07647, and use a coded carrier signal over the existing facility power line wiring where bursts of 120 KHz represent 1 binary bit and the lack of the burst at a zero crossing points are 0 binary bits. Continuous cycles can be preselected to represent different control codes for operating lights 560 and appliances 580. Binary control codes similar to the X-10 code that are used to control the turning on and off of electrical appliances are well known and have been described in previous U.S. Patents such as but not limited to U.S. Pat. No. 4,433,328 to Saphir et al., which is incorporated by reference. In operation, the X10 receiver can execute selected commands from the microprocessor 360 to the lights 560 using these codes. The commands can include but are not limited to controlling the operation of indoor and outdoor lights 560 with commands such as: On, Off, Dim, Bright, Flash, All lights On, and All Lights Off. The actual lights 560 can include but are not limited to exterior flood/lantern lights, pool lights, low voltage exterior lights, lamps, recessed lights, accent lighting and the like. Appliances 580 can be controlled similar to lights 560 with the exception of the bright and dim commands. Appliances 580 in the facility can include but are not limited to doorbells, pool/fountain pumps, hot water heaters, air-conditioners, fans, electrical fireplaces, electric valves, dishwashers, washing/drying machines, electrically controlled sprinkler systems, gates and the like, and combinations thereof.

Referring to FIG. 5, the PC/Laptop 520 can also be used to program ADAM and/or select when a home mode or a secure mode used. An IBM compatible 486 using 'C' language can be used here.

Remote monitoring can be used with ADAM in two ways. For example, output from siren 525 contact terminals 325 can tie into an existing security system which has a digital communicator or directly into a self contained digital communicator.

Referring to FIG. 5, a Keypad 522 can alternatively be used for controlling the mode selection of the ADAM system between a home mode and the secure mode which will be explained in more detail in reference to FIGS. 6–8. Useful keypads include but are not limited to a digital entry keypad manufactured by Securitron Co., a mini proximity card reader manufactured by Hughes Co., wireless transmitters/receivers manufactured by Linear, wireless key manufactured by Ademco, and an ultrasonic keypad manufactured by Senix.

Figure 6:
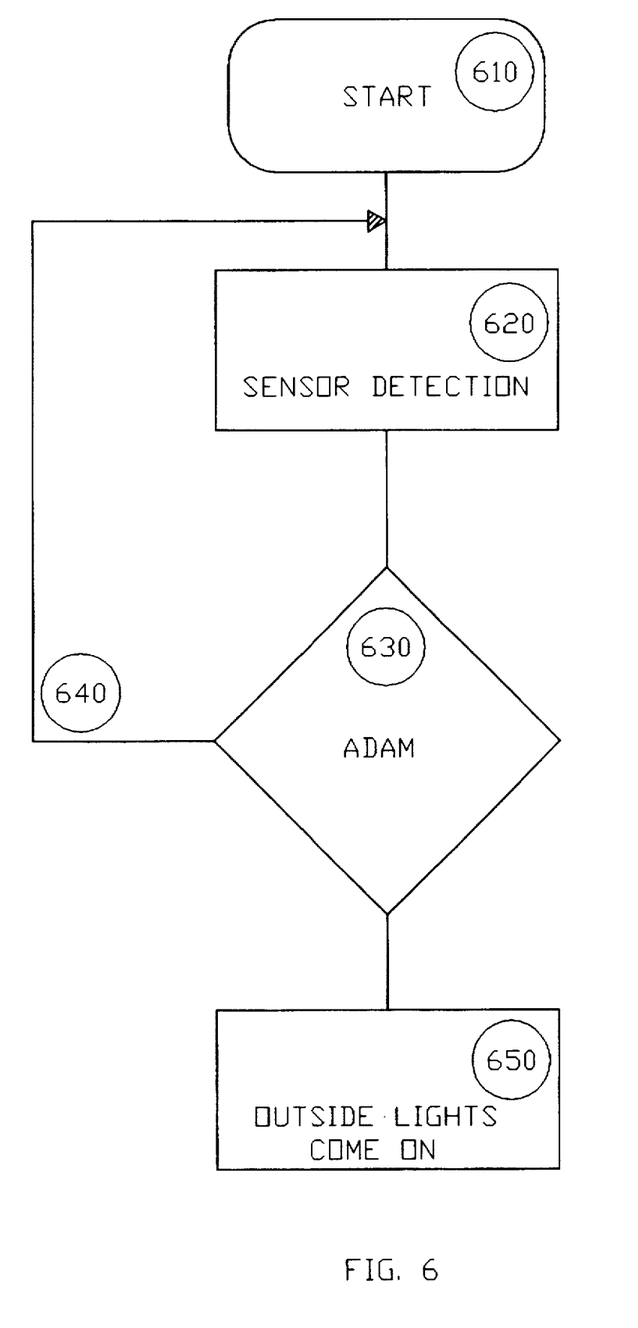
FIG. 6 is a flow chart of the ADAM system in the secure mode during a 10 pm to 6 am period.
Figure 7:
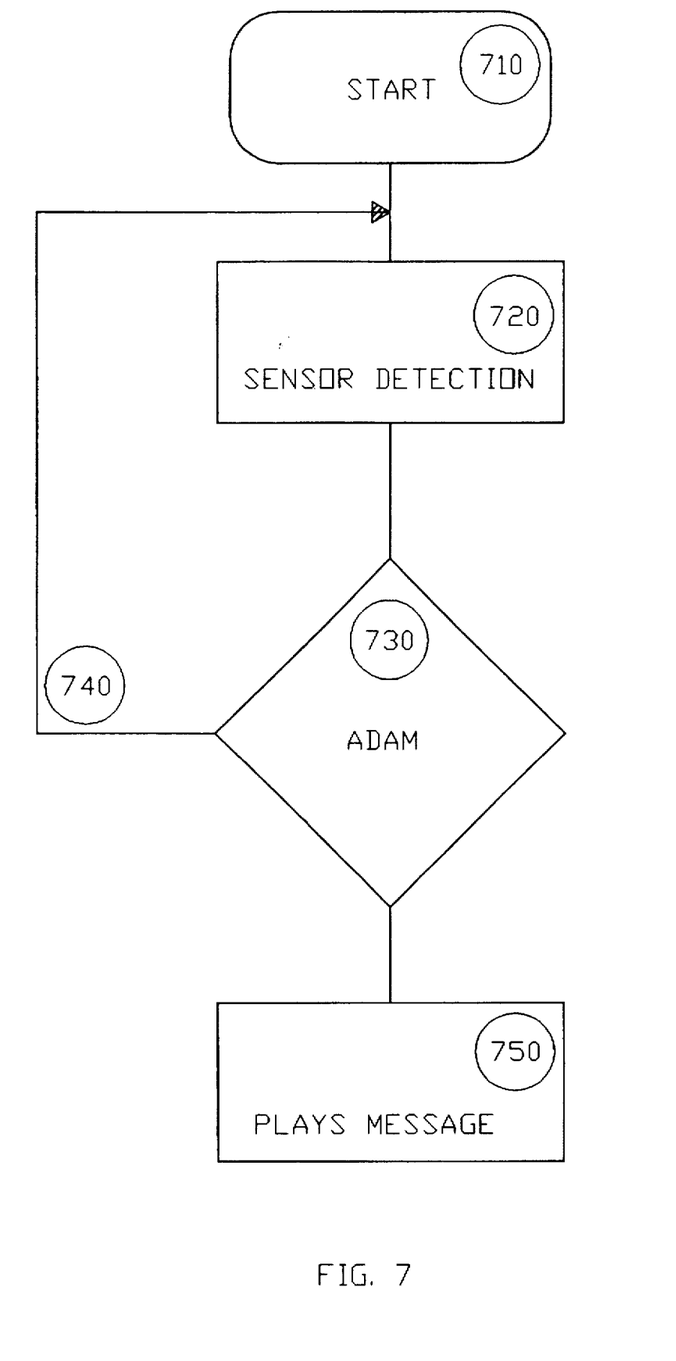
FIG. 7 is a flow chart of the ADAM system in the home mode controlling the outdoor front entranceway ultrasonic sensor and speaker for a 6 am to 10 pm period.
Figure 8:
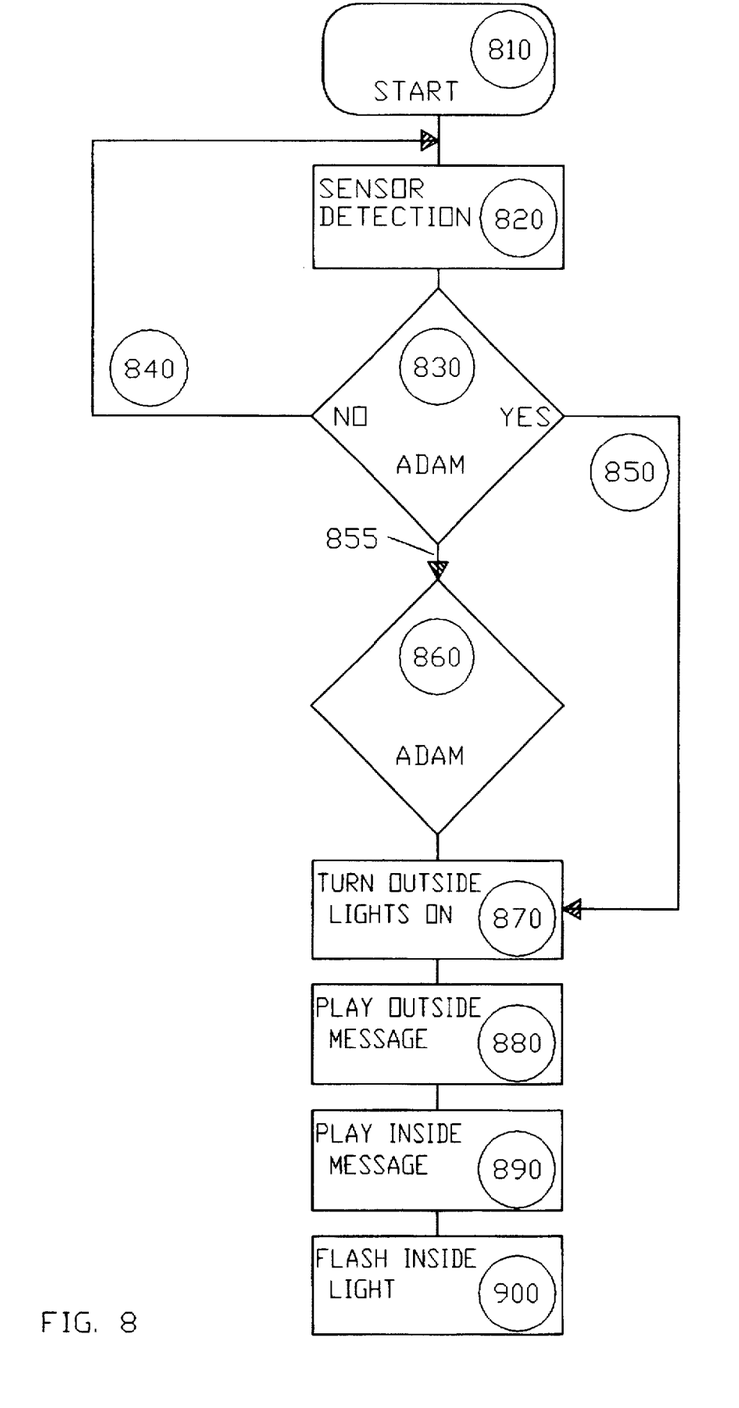
FIG. 8 is flow chart of the ADAM system in the home mode controlling the outdoor front entranceway ultrasonic sensor, outdoor speaker, interior and exterior lights, interior and outdoor speakers.

The components of the ADAM system depicted in FIG. 5 can be programmed to follow the steps depicted in the flow charts of FIGS. 6–8. FIG. 6 is a flow chart of the ADAM system in the secure mode during a 10 pm to 6 am period. Referring to FIG. 6, mode 600 starts at box 610, detection can occur by outside ultrasonic sensor/detectors (such as 140 FIGS. 1–2, 516 FIG. 5) which can be set to detect the presence of a person(s) and/or animal(s) entering a protected area. In FIG. 1-2, the protected area can be infront of the outside front door. Referring to FIG. 6, the ultrasonic sensors can be set to detect preselected parameters such as sensing the position of person(s)/animal(s) within a field expanding 90 degrees by approximately 30 feet out. Referring to FIG. 6, sensor detection by the ultrasonic sensors is at step 620, the location of the person(s)/animal(s) is sent to the ADAM system at 630(FIG. 5). ADAM can then turn outside lights on at box 650 if programing was a preselected condition for this feature. For example, the PC/Laptop 520 of FIG. 5 would have previously programmed the ADAM 300 to turn on exterior lights as shown at box 650 when intruders pass within 20 feet of the entrancedoor. If the preselected condition was not met, ADAM goes back to sensor detection 620, via line 640 and continues to sense for the preselected condition to exist.

FIG. 7 is a flow chart of the ADAM system in the home mode controlling the outdoor front entranceway ultrasonic sensor and speaker for a 6 am to 10 pm period. The home mode starts at step 710 where sensor detection occurs at step 720 which is similar to step 620 discussed previously. However, during these daytime hours, ADAM is programmed to provide verbal greetings during these daytime hours if certain conditions are met. During daytime hours the same ultrasonic sensor is programmed to detect person(s) and/or animal(s) entering the protected area infront of the outside front door. Ultrasonic sensor/detectors described previously can sweep an area up to 10 to 15 feet from the front door up to a 15 degree angle and look for person(s) and/or animals to cross this area to be protected. At step 740 ADAM can be programmed specifically to detect continuous movement in this protected area, that occurs over a preselected time, based on the date(weekdays verses weekends), including programming taking into effect daylight savings time. Preprogramming would safeguard against false trips of the systems where a greeting would not occur because of small animals straying infront of the door. If selected conditions are met, then ADAM can authorize a greeting message to be played over a speaker at step 750 such as "Welcome to the Jacobs Home." Messages can be programmed to be automatically changed during the day(Good Morning before noon and Good Afternoon after noon) and automatically change over different holidays(ie "Merry X-Mas", "Happy New Year."

FIG. 8 is flow chart of the ADAM system in the home mode controlling the outdoor front entranceway ultrasonic sensor, outdoor speaker, interior and exterior lights, interior and outdoor speakers. After the first step 810, sensor detection 820 occurs by either a person(s) entering a selected protected area(by an ultrasonic sensor) or when an animal(s) enters selected area being protected. Sensed information is sent to ADAM at step 830. If the sensed data does not meet the threshold parameters set by the user the flow chart goes back along line 840 to continue sensing data. If ADAM at step 830 determines that all threshold parameters are met then ADAM can directly execute all commands that can include: turning on outside lights 870, Playing outside message(s) 880, play inside message(s) 890 and flash inside light(s) 900. If ADAM determines that some parameter thresholds by the sensors are met then ADAM can determine which parameters are met through lines 855, 860 and perform If/Then logic on which parameter thresholds were met by which ultrasonic sensors/drycontact switches, and ADAM can selectively activate 870, 880, 890 and 900.

Although the preferred embodiment has described activating and deactivating electrical devices such as a light, ceiling fan, stereo, television, and air conditioning, other types of electrical devices can be included. The invention can be used to activate and deactivate electrical devices such as but not limited to opening a garage door when a person or automobile enters a garage.

Although the preferred embodiments uses TW523 and X10 carrier coded signals, other types of encoded carreir signals, modulation signals, multiplexing and the like can be used to control activation and deactivation of the electrical appliances.

The novel system can operate tasks in the home through multi-controls. The novel system can operate events via completely timed static events(i.e. for preselected time periods). The invention can also be used to activate or deactivate events through sensor detection. The invention can further be used be used to activate and deactivate events directly and/or remotely. Furthermore, the invention can use any combination of the above.

The air conditioning of a home can be automatically adjusted by the system. Air conditioning includes but is not limited to heating, cooling, fans, combinations thereof, and the like. The automatic adjustments can be preselected timed events such as activating and deactivating air conditioning during certain hours of the day. The novel system can activate air conditioning by presence detection such when person(s) enter a house or room area and the system can deactivate air conditioning when person(s) leave the room area or house.

Although the above described invention has been described for use in a house environment, the invention has applicability to other environments such as but not limited to an apartment, condominium, office, hotel room, museum, exhibit hall and the like. For example, persons entering the lobby of an apartment building can be directed by the invention toward the elevator, bathrooms, concierge, management office, directory and the like. In a museum and exhibit hall, patrons can be greeted with voice recordings and have points of interest such as paintings and exhibits pointed out as they pass through(i.e. on your left is . . . and on you right is . . . ).

The ADAM system can be used with storefronts. Either during business hours or after, as people pass by the window of a store, ADAM can bring the window display alive, via lights, special effects, verbal messages and resets when the potential customer leaves the area.

The ADAM system can operate efficiently with retail facilities. As the potential customer walks around the store each display comes alive, describing features about the product(s).

The ADAM system can operate efficiently with furniture showrooms. As the potential customer walks into the bedroom display, the end table lights come on and a spot light comes on highlighting a piece of furniture, then a few seconds later a verbal message describing the furniture and providing prices comes on, all automatically.

ADAM can be tied into safety and fire alarm systems allowing these security systems to reach higher levels of efficiency (i.e., fire alarm goes off, ADAM calmly tells the people which way to get out and based on their position lights the way for them. ADAM can also take information from other sensors and mid-stream change the directions of the people.

For real estate applications, ADAM can be used in support of the agent, the potential buyer approaches the home/business and is greeted by ADAM "Welcome to this 3 bedroom, 2 bath home, please come in and experience the future." Once inside, ADAM will make each room come alive, highlighting all of the features the realtor wants featured.

For restaurants, ADAM can give potential customers the specials of the day/week prior to the customers arriving along with greeting them on the way in and thanking them on the way out.

For home swimming pools, ADAM can be used where an ultrasonic sensor is placed above the pool looking down. When the water level gets too high ADAM sends a command to an electric valve commanding it to open. The valve stays open until ADAM gives a command to close it.

Medical applications can be used with ADAM. For example, people who are in wheel chairs can now activate/ deactivate devices(ie lights, speakers, televisions, appliances) based on the placement of the chair. Place a sensor under a bed, when the sensor sees movement, it contacts the nurses station.

Large Retail Chains can be enhanced with the ADAM system. In case of emergencies, ADAM can provide verbal direction to the patrons, at night the same sensors could be used to complement existing security systems. The ultrasonic sensor with ADAM can provide the piece of knowledge that every security professional wants to know prior to entering a facility (is there anyone in there now) not only can ADAM tell them that, but can also tell them if there is movement in more than one area.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A system for automatically detecting and monitoring moving objects outside and inside of a building comprising:

(a) exterior sensing means for detecting a person approaching an entrance way to a building and providing a first signal when the person is within a first preselected range;

(b) exterior audio means for generating a greeting voice message to the visitor in response to the first signal;

(c) interior audio means for alerting a building occupant in response to the first signal, the interior audio means chosen from at least one of a voice message and a doorbell; and (d) interior sensor means for detecting the building occupant entering a room to activate an electrical device in the room and for deactivating the electrical device when the occupant exits the room.

2. The system of claim 1, wherein the electrical device is chosen from at least one of:

a light, a ceiling fan, an air conditioning heating and cooling system and a television and stereo system.

3. The system of claim 1, further comprising:

(d) interior bedroom sensor means for activating an overhead light when the building occupant enters a bedroom, the interior sensor means further activates a bedroom lamp when the occupant is a preselected distance from a bed in the bedroom while deactivating the overhead light.

4. The system of claim 3, further comprising:

an air conditioning unit activated by detection of the building occupant in the bedroom, the air conditioning unit deactivated by the building occupant exiting the bedroom.

5. The system of claim 1, further comprising:

(d) bathroom sensor means for activating a light and fan when the building occupant enters the bathroom and deactivating the light and the fan when the building occupant exits the bathroom.

6. The system of claim 1, further comprising:

exterior lights activated by the first signal from the exterior sensing means during selected night hours.

7. The system of claim 1, wherein the sensing means includes a range sensor chosen from at least one of:

an acoustical transducer, a radar transducer, an ultrasonic transducer, and an infra-red transducer.

8. A multimode system for automatically detecting and monitoring of persons both inside and outside of a building facility, the system comprising:

a home mode having interior building sensors and exterior building sensors that activate electrical devices when a person enters into and passes through the building, the home mode deactivating the electrical devices as the person passes a preselected range beyond the interior and the exterior building sensors; and a security mode for the exterior sensors, the security mode activating a first alarm when another person is within a first preselected range outside the building, the security mode activating a second alarm when the another person is within a second preselected range which is less than the first preselected range, and the security mode activating a third alarm when the another person is within a third preselected range which is less than the second preselected range, wherein the first alarm, the second alarm and the third alarm are dissimilar from one another.

9. The multimode system of claim 8, the exterior sensors in the security mode including:

the first preselected range being approximately twenty feet or less to the building;

the second preselected range being approximately ten feet or less to the building;

the third preselected range being approximately one foot to the building; and wherein the first alarm, the second alarm and the third alarm each include at least one of:

a voice warning message directed inside the building, a voice warning message directed outside the building, interior lights activated, exterior lights activated, a siren activated, a sprinkler activated, and a remote alarm activated.

10. The multimode system of claim 9, the home mode including:

exterior audio means activated in response to the exterior sensing means detecting a visitor approaching an entrance way to the building, the exterior audio means generating a greeting voice message to the visitor approaching the entrance way;

interior audio means alerting a building occupant to the approaching visitor automatically activating a doorbell to the occupant; and interior electrical devices activated by the interior sensor means for detecting the person entering a room, the electrical devices deactivated when the person exits the room, the electrical devices chosen from at least one of:

a light, a ceiling fan, air conditioning, television, and a stereo.

* * * * *